June 12, 1956     J. H. SCHMIDT     2,750,121
AUTOMATIC WASTE DISPOSAL APPARATUS
Filed Oct. 31, 1951     3 Sheets-Sheet 1
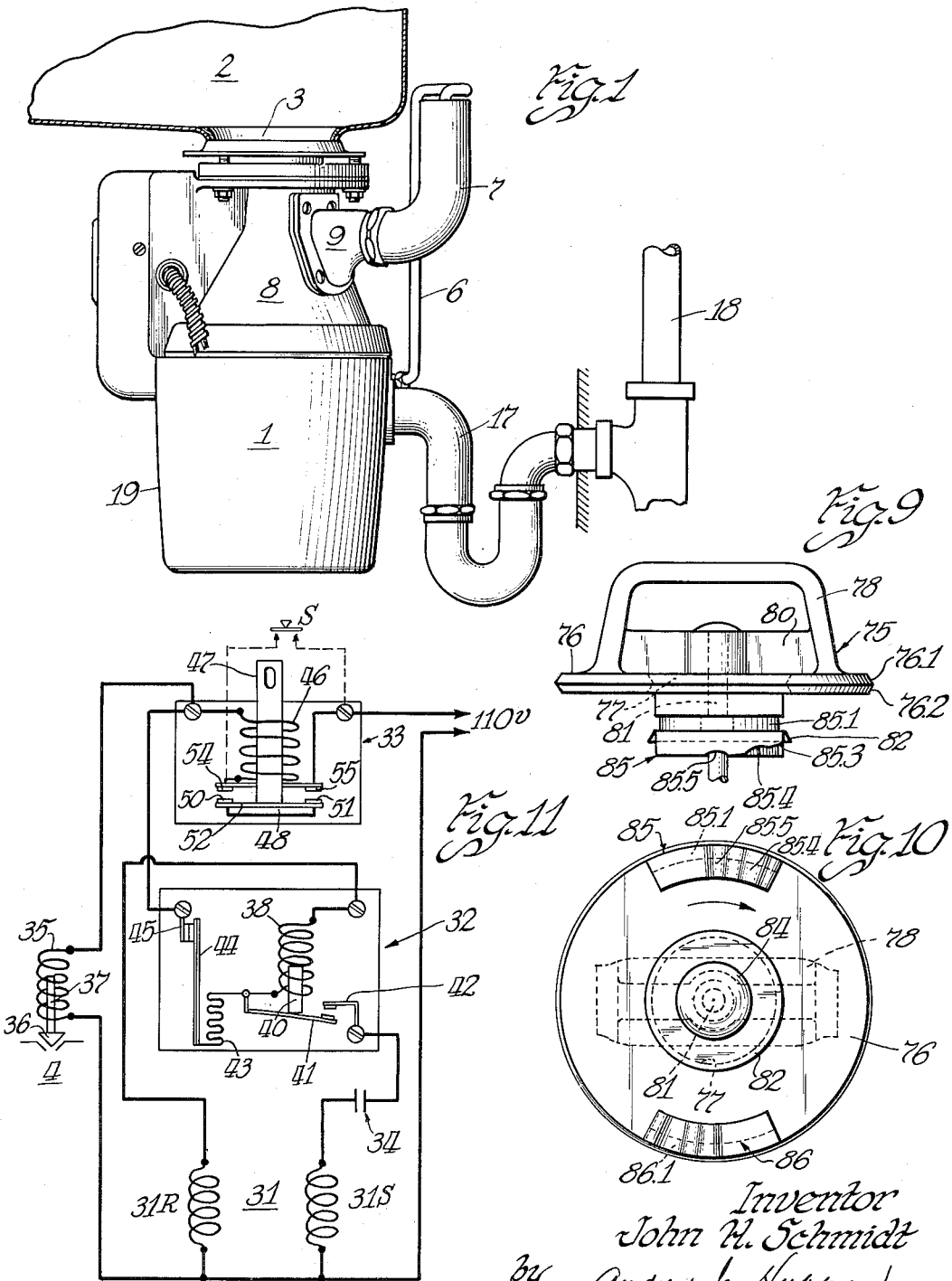
Inventor
John H. Schmidt
By Andrew L. Hubbard
Atty.

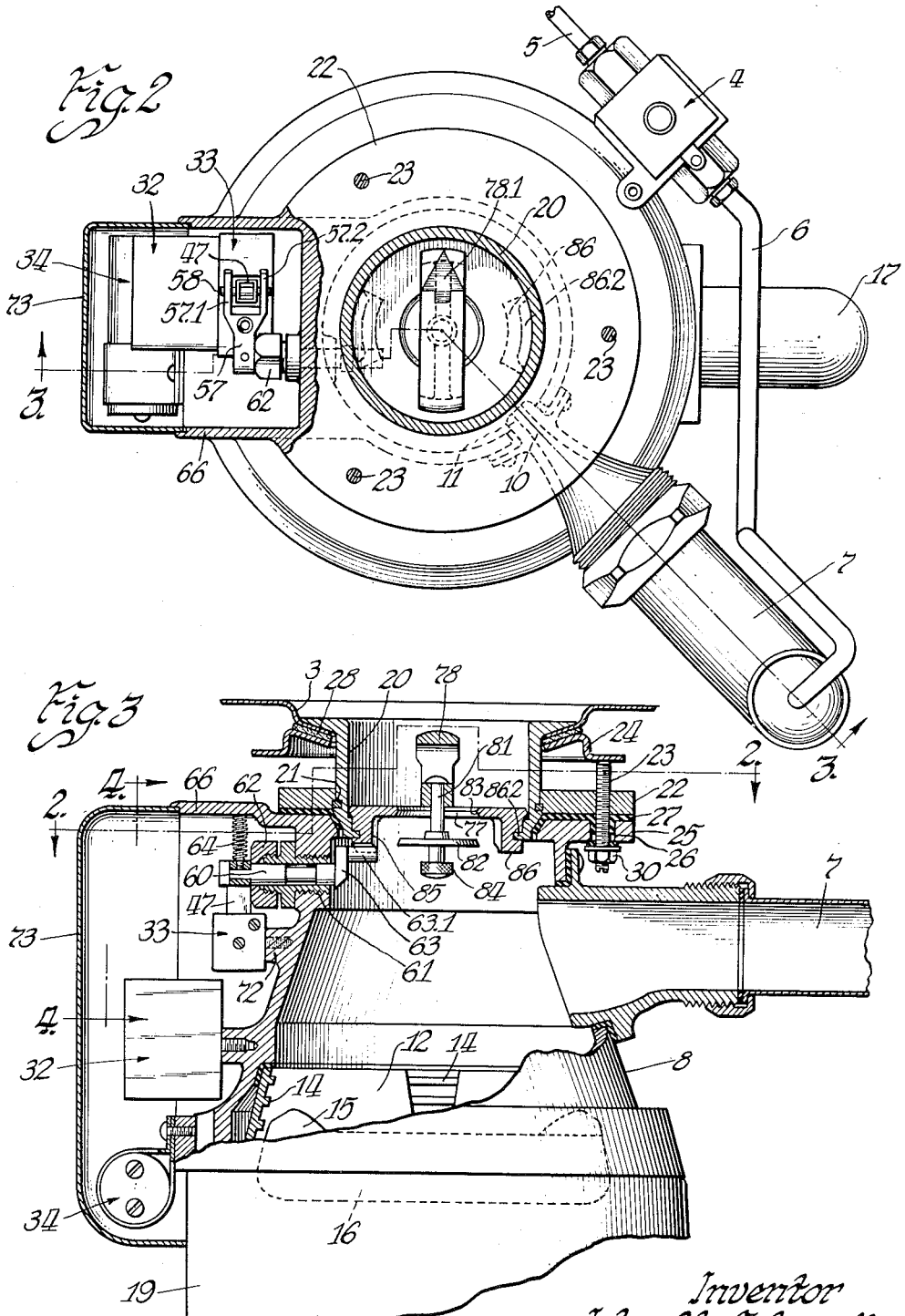

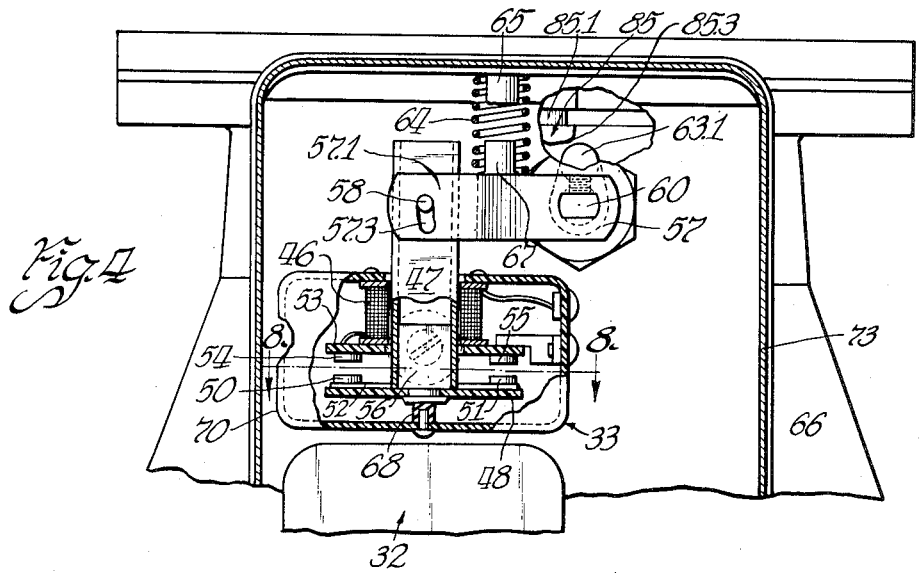
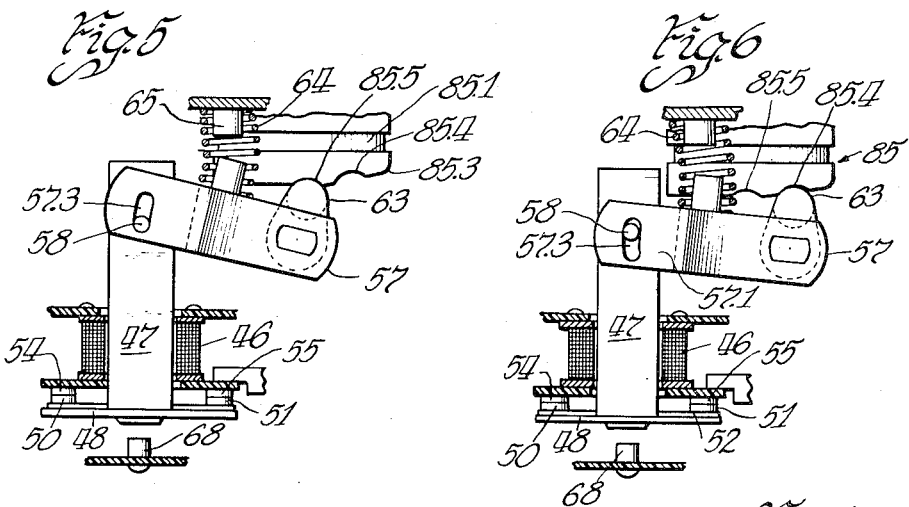
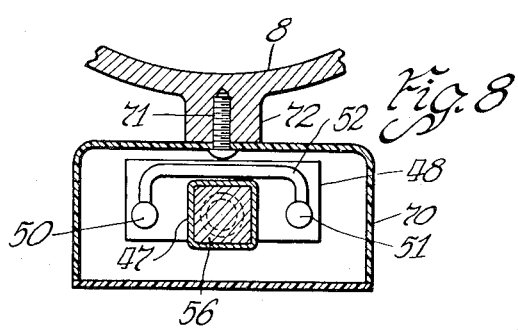
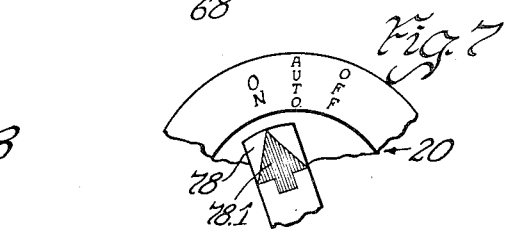

United States Patent Office 2,750,121
Patented June 12, 1956

2,750,121

AUTOMATIC WASTE DISPOSAL APPARATUS

John H. Schmidt, Oak Park, Ill., assignor to General Electric Company, a corporation of New York Application October 31, 1951, Serial No. 254,066

8 Claims. (Cl. 241—32.5)

This invention relates to waste disposal apparatus such as the so-termed "garbage grinders" in which food scraps and similar kitchen waste are comminuted in the presence of water and the resultant mixture discharged into the waste disposal system of the building. In particular, the invention concerns a control system pursuant to which the operation of the waste disposal apparatus may be made automatic to a high degree.

The presently most effective types of garbage grinders provide a relatively deep waste-receiving chamber at the base of which is a horizontally rotatable motor-driven flywheel having impeller structures which throw the waste materials about the lower portion of the chamber, to be reduced to small particle size by striking and scraping against cutting surfaces projecting into the chamber. This operation is carried out in the presence of water flowing into the chamber during the entire grinding operation. The slurry of comminuted waste particles and water passes through grooves or ports in the side wall of the chamber and then through a discharge system to the sewerage piping of the building.

Domestic types of waste disposal apparatus are usually arranged to be supported beneath the kitchen sink, as by being suspended from the sink bowl by a flanged sleeve fitted into the sink drain opening and clamped securely in position. The sleeve provides the inlet to the comminution chamber and is usually provided with a removable closure optionally useful to seal the drainage opening when the sink bowl is to hold water, to permit normal drainage from the sink, or when locked in position, to prevent access to the interior of the comminution chamber during the operation of the apparatus. It is now widely accepted practice to use the closure as a motor switch actuator; the closure automatically closes a normally open switch in the drive motor circuit when placed and secured in a particular position. See, for example, the apparatus described and claimed in the J. H. Powers Patent No. 2,185,037, granted December 26, 1939, for "Waste Disposal Apparatus." It is also common to install a water-flow responsive switch in the cold water line serving the kitchen sink faucet, said switch also being in the motor circuit, and closing only when a predetermined volume of cold water is discharging from the sink faucet. A typical arrangement of this type is disclosed and claimed in the J. H. Powers Patent No. 2,244,402, granted June 3, 1941, for "Waste Disposal Apparatus." With these safeguards the motor will operate only when the closure is in the proper position and water is flowing from the sink bowl into the waste-receiving chamber.

These presently used devices are entirely manually controlled: the operator must manipulate the closure control and the water faucet both at the beginning and the end of the grinding operation.

It is a principal object of this invention to provide means whereby the operation of the apparatus becomes fully automatic after the single manual operation of closing the control circuit.

It is another object of the invention to provide means whereby waste disposal apparatus may be operated either manually or automatically at the option of the user.

It is a further object of the invention to provide a waste disposal apparatus in which completion of the motor-starting circuit automatically opens a water inflow valve in a water line arranged to supply the comminution chamber with the proper quantity of water during the entire waste disposal operation.

It is still another object of the invention to provide a waste disposal apparatus in which the motor circuit will automatically open and the water inflow cease when the charge of waste food in the grinder has been substantially completely disposed of.

It is a further object of the invention to provide a control system for an electrically operated waste disposal apparatus in which after a switch mechanism has been manually operated to closed-circuit position, the power supply to the motor will be automatically terminated after the charge of waste material has been disposed of to the extent that the drive motor is running under substantially no load.

I have discovered that in waste disposal apparatus powered by fractional-horsepower electric motors, there is a consistent relationship between the current demand and the load on the motor as established by the quantity and nature of the charge of waste within the comminution chamber. For example, a charge of miscellaneous soft waste—vegetable peelings, fruit or melon rinds, pea pods, corn husks, meat scraps, and the like—will load the motor to the extent that it will draw about five amperes; large, hard, bones impose a two to two and a half ampere load; and miscellaneous small bones, such as chicken bones or cooked meat bones, will cause the motor to draw about three amperes. When running at no load, as when the food waste charge has been fully disposed of, a suitable motor will draw only about 1.25 amperes. In practicing the present invention therefore, I provide in the motor circuit an electromagnetically actuated switch which will remain in closed-circuit position so long as the electrical energy level in the circuit is at or above that characterized by a "no-load" condition of the motor. For example, the electromagnetic switch may open the motor circuit when the current being drawn drops to about 1.5 amperes. The motor therefore remains in operation so long as there remains any appreciable quantity of the food waste in the chamber, but its circuit will automatically be broken when the motor begins to run "free." The switch is arranged to be initially closed by manually operable means, and when the apparatus is on automatic operation, as later described, remains closed so long as the amperage of the motor circuit remains above a predetermined level. The water supply to the chamber is controlled by a solenoid actuated water valve in a parallel circuit, whereby said valve will remain open only during the period in which the control switch is in closed-circuit position.

Other features and advantages of my invention will be apparent from the following detailed description of a presently preferred embodiment thereof, read in connection with the accompanying drawings, in which Fig. 1 is a side elevation of a waste food disposer embodying my invention; the apparatus is attached to a kitchen sink which is fragmentarily shown in section; Fig. 2 is a top plan view of the apparatus taken in section along lines 2—2 of Fig. 3; Fig. 3 is a side sectional elevation of the upper portion of the apparatus taken in section on lines 3—3 of Fig. 2; Fig. 4 is a fragmentary front elevation taken in section along lines 4—4 of Fig. 3 with a portion of the chamber wall being broken away to show the closure-actuated control mechanism; Figs. 5 and 6 are somewhat schematic representations of the relationship of the control mechanism and control relay during the "on" and "automatic" phases of operation respectively; Fig. 7 is a fragmentary plan view of a portion of the flange of the inlet sleeve of the apparatus showing the indicia representing the three operational positions of the device; Fig. 8 is a plan section of a contact element and armature of the control relay taken on lines 8—8 of Fig. 4; Figs. 9 and 10 are respectively side and bottom plan views of the control stopper; and Fig. 11 shows a presently preferred control circuit.

General description

Referring first to Figs. 1 and 2, a waste disposal apparatus 1 is suspended from the bowl of a sink or the like 2, being attached thereto about the drainage opening 3. Means are provided to supply the apparatus with water, as by a solenoid-operated valve 4, having an inlet line 5 suitably connected to a cold water supply pipe (not shown) and a discharge tube 6 which terminates at a pipe 7, communicating with a comminution chamber 8 through a fitting 9 projecting through the wall of said chamber. The fitting 9 has a slotlike discharge port 10 which projects slightly into the chamber and is protected against being clogged with waste by a guard wall 11.

The garbage grinding apparatus itself may be any one of several well known types now commercially available; for example, it may be of the type disclosed in Patent No. 2,565,322, entitled "Grinder Mechanism for Waste Disposal Apparatus," issued on August 21, 1951, to James H. Powers. Therefore, only those portions of the apparatus directly concerned with the present invention have been detailed. However, it will perhaps be helpful to note that the lower part of the chamber 8 is provided with a ring 12 of hard, wear-resistant, material, said ring having a plurality of serrated shredder pads 14 which form primary cutting devices against which the food waste is thrown or carried by impeller members 15 projecting from the surface of a flywheel 16. The ring 12 has drainage grooves (not shown) through which the slurry of comminuted waste and water flows into a discharge chamber (not shown) below the flywheel. To the outlet of the discharge chamber is suitably attached a conventional waste trap 17 connected in familiar fashion to a waste disposal line 18 serving the building. A drive motor (not shown) is arranged with its shaft extending vertically for direct attachment to the flywheel. The motor is housed within the casing 19 at the base of the apparatus and may be of the capacitor-start type having a one-third horsepower rating.

Conventional means are employed to suspend the apparatus below the sink bowl. For example, Fig. 3 shows a sleeve 20 fitting within the drain opening 3 and extending downwardly therefrom. The sleeve is grooved to receive a snap ring 21 which provides a shoulder on which rests a rigid support ring 22. Ring 22 has a suitable plurality of threaded openings to receive screws 23 which are arranged to bear against a clamping ring 24 positioned at the underside of the sink bowl. The upper rim of chamber 8 has an outwardly extending flange 25 provided with apertures 26 through which the screws 23 freely pass. A gasket 27 is placed between ring 22 and flange 25, and another gasket 28 is interposed between the clamp ring 24 and the sink bowl. Gasket 27 serves as a cushion and absorber to minimize the transmission of vibrations from the apparatus to the sink during the garbage grinder operation.

In mounting the apparatus on the sink, gasket 28 and clamp ring 24 and ring 25 are threaded over the sleeve in that order and snap ring 21 is applied, whereupon the screws 23 are made up uniformly to clamp the assembly tight to the sink. The flange 25 (with gasket 27 thereon) is then placed in position and the apparatus secured in final position by making up the nuts 30.

The control circuit

Referring now to Fig. 11, the electrical system for the waste disposal apparatus includes the motor 31 having a run winding 31R and start winding 31S, a combined start and overload control 32, and a demand-current-sensitive master control switch 33, all interconnected as shown and arranged to be supplied from a suitable power source such as the usual alternating current house service. It has been assumed that the motor is of the capacitor-start type, and a capacitor 34 is therefore interposed between the start control 32 and the start winding 31S. A parallel circuit includes the coil 35 of the solenoid actuated water valve 4. Said valve may be of any conventional type in which the coil must be energized to open the valve for water flow. For example, the valve may be of the pilot-operated type shown in Patent No. 2,305,151, granted December 15, 1942, to G. C. Fields. I have schematically illustrated the valve as having a valve member 36 at the end of an armature 37, preferably spring biased into a normally closed position.

As previously noted, the motor 31 draws a "no-load" amperage of about 1.25; such a motor will draw an "inrush" or starting current of about 30 amperes. The start control therefore may be of conventional type in which a solenoid coil 38 responds to a current of about 15 amperes to attract an armature 40 which normally rests against a spring contact finger 41 to flex it away from a cooperating stationary contact 42; upon release of the spring contact by retraction of the armature 40, the respective contacts 41 and 42 will assume a closed-circuit relationship. The start control includes an overload protection of the thermally actuated type which utilizes a resistor element 43 in heat transfer relation with a bimetal thermostat 44 having a contact element cooperating with a fixed contact 45. It will be noted that the thermostat 44 is itself a conductor in an electrical circuit. The master control switch 33 has a coil 46 capable at any amperage above approximately 1.5 to attract an armature 47 and hold it in circuit-closing position, as later explained. It will be apparent that the current drawn by the coil 46 is proportional to that drawn by the motor. Armature 47 carries at one end an insulation member 48 on which are contacts 50 and 51 interconnected by a buss 52. Carried by the sleeve on which coil 46 is wound (see Fig. 4) is an insulation plate 53 having contacts 54 and 55 cooperating respectively with contacts 50 and 51. It will be observed from Fig. 4 that armature 47 passes freely through coil 46 and the plate 53, and that said armature may conveniently be of rectangular tubular construction having a magnetic core 56 at one end thereof.

The circuit itself is obvious from inspection of Fig. 11. When armature 47 is manually displaced by means presently described to cause the buss 52 to complete the circuit through coil 46, a circuit is completed through the thermal overload system and coil 38 to the running winding 31R and then to the "ground" side of the line. The inrush current being greater than the 15 amp. pull-in value of coil 38, armature 40 disengages from spring contact 41 which thereupon completes the circuit to start winding 31S. Simultaneously, water valve coil 35 is energized through its circuit to open the valve for water-flow.

As the physical resistance to motor operation is overcome and the motor gains speed, the current drawn by the motor drops to its normal load amperage which is substantially below that required to maintain the energy of coil 38 at its armature attraction level, and said armature urges the spring contact 41 into open-circuit position, thus cutting out the start winding 31S. Water valve coil 35 and switch coil 46 remain at the hold-in level.

As the load of food waste in the comminution chamber is disposed of by discharge through trap 17 to waste line 18, the motor load diminishes. At the final stages of waste disposal the motor is under substantially no load. The current drawn by the motor and coil 35 at this stage of operation is below the hold-in value of coil 46, and because the coil then lacks energy to hold the armature 47 against the gravity or other bias, the armature drops, opening the circuit. The motor and the water valve solenoid become de-energized, signifying the end of the disposal operation.

*Manual start control*

It has been mentioned that to start the waste grinding operation, armature 47 must be moved to bridge the contacts 54 and 55 for completion of the circuit across coil 46. This initial operation may be effected by mechanism operated by manipulation of a closure member within the inlet sleeve 20 to a predetermined position. For example, a suitable armature-lifting device may comprise a lever 57 having the spread legs 57.1, 57.2 straddling the armature 47, as appears in Fig. 2. Each said leg has an arcuate slot—see 57.3—mutually aligned and receiving the extending portions of a pin 58 fixed to armature 47 and projecting from side walls thereof. Lever 57 is in turn firmly secured to one end of a rock shaft 60 which is journalled in a sleeve 61 threaded into the side wall of the chamber 8. Any suitable gland or stuffing nut 62 is applied to the outboard end of the sleeve, see Fig. 3. Within the chamber immediately beneath sleeve 20 is a crank member 63 having a preferably cylindrical arm 63.1. Lever 57 is preferably spring biased to urge the armature 47 into open-circuit position; for example, there is provided a coil spring or equivalent 64 supported between a pin 65 projecting from a wall 66 of a housing extending from the wall of chamber 8, and a pin 67 on the lever 57. The home position of amature 47 may advantageously be established by a bumper 68 supported on the lower wall of the housing 70 of relay 33. In such home position, the arm 57 is horizontal and crank 63 vertical, as shown in Fig. 4. The housing 70 may be secured in any suitable fashion to chamber 8, as by one or more screws 71 entering a boss 72 extending from the wall of said chamber. A housing for the start control 32 and the capacitor 34 may be similarly mounted, as shown in Fig. 3, and the control organization enclosed by a cap 73 cooperating with the said housing wall 66.

Referring now to Figs. 9 and 10, a suitable closure 75 comprises a disc 76 having a bevelled rim forming the respective valve surfaces 76.1 and 76.2. The disc has a central aperture 77 and extending from one surface of the disc across a diameter of the aperture is a handle 78. The handle has a web 80 which slidably receives a headed rod 81 passing through the center of the aperture and securely carrying a valve disc 82 having a bevelled edge for cooperation with the bevelled rim 83 of aperture 77, as best shown in Fig. 3. An extension of rod 81 may be provided with a knob 84, preferably of smaller diameter than disc 82. Extending from the rim of disc 76 are diametrically opposed cam members 85, 86, which, see Fig. 10, are of short arcuate length. Each of these cam members has a locking groove, respectively 85.1 and 86.1, which as presently explained receive locking lugs 85.2, 86.2 projecting inwardly from the base of the sleeve 20. It will further be noted that the lower portion of sleeve 20 has a suitable shoulder which serves as a seat for the disc 76.

To remove the closure from the Fig. 3 position, the operator grasps the handle and rotates it clockwise (as viewed in Fig. 2) until the lugs 85.2 and 86.2 have disengaged from the grooves 85.1 and 86.1 of the stopper cams, whereupon the closure may be lifted out of the sleeve. This may have been done to permit food scraps to be dropped into the chamber 8; or it may have been the desire to close the sink drain, in which event the closure would be turned handleside down and returned to position supported on the shoulder of the sleeve. Disc 82 seats by gravity on rim 83 to complete the stopper action. Returning the closure to the Fig. 3 position and rotating it so that it is locked in position by the engagement of the respective lugs 85.2 and 86.2, readies the apparatus for waste disposal service, as now explained.

Cams 85, 86 are of identical contour but opposite hand; so either may be used in association with the relay actuating crank 63. As shown in Figs. 5 and 9, cam 85 has a rounded nose 85.3, a downward slope 85.4 having a shallow detent notch, and a base portion 85.5 also having a shallow detent portion. When closure 75 is placed in operating position within sleeve 20 and rotated counterclockwise of Fig. 2 until just after the lugs 85.2, 86.2 enter the locking grooves 85.1, 86.1 for positive engagement, the cam 85 will be as indicated in Fig. 4: the nose of the cam will not yet have engaged the crank arm 63.1 to exert any turning effort thereon. In such position an arrow or other marker 78.1 on handle 78 will point to "off" inscribed on the flange of sleeve 20. Lever 57 will be as shown in Fig. 4 with pin 58 engaging the upper edge of slot 57.3. The operator then continues to turn the handle counterclockwise, during which movement the slope 85.4 will engage the crank and turn it clockwise of Fig. 4 until the base portion 85.5 positions the crank and lever in the Fig. 5 position, and said lever has raised armature 47 until the circuit has been completed across the terminals 54 and 55 to energize coil 46. Handle 78 will then point to "on" (Fig. 7). The disposal operation will then begin and because the circuit across coil 46 is now being mechanically held closed, the motor 38 would continue to run and the water continue to flow through valve 4 until the operator manually restored the handle to "off," at which point cam 85 has disengaged from crank 63. Coil 46 is incapable of holding the armature against the combined gravity bias of the armature and the strength of spring 64 regardless of the energy level of the coil. Lever 57 will drive downwardly of Fig. 5 and will engage pin 58 to move the armature to switch-open position. This, of course, will stop the motor and cause the water valve 4 to close. Such wholly manual operation is useful and advantageous when one wishes to flush away a few small scraps of waste, which may be done in a very short time.

To set the apparatus for automatic operation, handle 78 is moved clockwise from "on" position, as viewed in Fig. 7, until its arrow points to "auto." In this position, the cam slope 85.4 is engaging the crank 63.1 and the lever 57 has rotated a few degrees clockwise (see Fig. 6) until the pin 58 is at some midway point in slot 57.3. Cam 85 is restraining lever 57 and thereby rendering spring 64 impotent. The power of coil 46 maintains the armature in closed-circuit position against the armature weight, and the electrical circuit remains closed until the current demand of the motor drops below 1.5 amps., at which time the armature of master control switch 33 will drop out to open the motor and water valve solenoid circuits. Although it is quite satisfactory to have the armature drop open by gravity bias, a light spring or other biasing means (not shown) may be employed. Obviously, the operation of the apparatus may be stopped at any time during automatic operation by manually turning the handle 78 to "off" position.

Although for considerations of safety I prefer to have the control switch 33 close as a result of manual operation of the closure 75 to a locked position, it will be obvious that other means may be used to bring the switch contacts to closed-circuit position. For example, I have indicated in dotted line in Fig. 11 a circuit in which a normally open pushbutton switch S, when manually closed, will energize coil 46 to attract the armature to closed-circuit position, after which the operation of the apparatus will proceed automatically as above described. It will be understood that such an arrangement would supplant the armature actuating crank and lever system and the stopper cams by which the system is operated.

*Summary of operation*

To dispose of kitchen waste and the like, the operator removes the closure 75 from the sleeve 20 and drops the waste material into the chamber 8. Returning the closure to position, the operator rotates it to "on."

As the cam 35 co-acts with crank pin 63.1, the detent portions of the cam provide sufficient interruption of free movement for the operator to sense the passage from the "off" to the "on" positions, and, of course, any suitable stop (not shown) may be provided to prevent movement of the closure beyond the "on" position. The engagement of the cam grooves and collar lugs positively locks the stopper against withdrawal from sleeve 20. As above noted, movement to the "on" position mechanically closes the circuit at control switch 33 applying power to the motor and energizing the solenoid coil 35 to open valve 4 for admission of water to the chamber. It will be noted that the closure disc 32 is open during the grinding operation, thus permitting use of the sink for any purpose which does not require that water be held in the sink bowl. For automatic operation, the handle is moved to "auto," in which position the lever 57 is no longer mechanically holding the control switch 33 is closed-circuit condition. The lever is in position permitting adequate downward movement of pin 58 in slot 57.3 to permit the relay contacts to break cleanly when the dropout level of switch coil 46 is reached at the end of the grinding operation. It may be noted that the normal frictional engagement between the collar lugs and the walls of the locking grooves in the cams is augmented by the slight upward bias exerted by crank 63 against the closure, which therefore holds firmly in "auto" position.

While there has been described what is at present considered to be the preferred embodiment of the invention, it will be understood that various modifications may be made therein, and it is intended to cover in the appended claims all such modifications as fall within the true spirit and scope of the invention.

I claim:

1. In waste disposal apparatus having a chamber to receive waste material, a removable closure for an entrance to said chamber, means for supporting said closure for manual rotation within said chamber entrance, comminution means within said chamber for reducing said waste material to small particle size, normally closed valve-controlled means for admitting water into said chamber, means for discharging a mixture of water and reduced waste material from said apparatus, and an electric drive motor for operating said comminution means and said discharge means; the combination of electromotor means operable when energized to open said water valve, an electric circuit for energizing said electromotor means, an electric circuit for energizing said drive motor, a relay having an electromagnetic coil in circuit with said drive motor to draw electrical energy in proportion to the energy drawn by said motor, switch means common to said valve motor circuit and said drive motor circuit, means biasing said switch to open-circuit position, a relay armature operatively associated with said switch means to operate the same between its open and closed-circuit positions, said relay coil holding said armature in switch-closing position against said bias at electrical energy levels characteristic of motor operation under load and releasing said armature at energy levels characteristic of the no-load operation of said motor, a lever pivotally mounted with respect to said armature, lost motion means mechanically associating said lever and said armature, means biasing said lever into rotation to drive the armature into circuit-opening position, means including a cam follower to rotate said lever, and cam means on said closure cooperating with said cam follower, said cam means upon rotation of said closure to a first predetermined position operating said lever to move the armature to control-switch closing position and upon rotation of said closure from said first to a second predetermined position adjusting the position of said lever relative to said armature to release the same for action according to the energy level of said relay coil.

2. The combination according to claim 1, further characterized by the closure having a third predetermined position at which the cam disengages from the follower to release the lever for movement of the armature to control-switch opening position regardless of the energy level of the relay coil.

3. In waste disposal apparatus having a chamber to receive waste material, a removable closure for an entrance to said chamber, means for supporting said closure for manual rotation within said chamber entrance, comminution means within said chamber for mechanically reducing said waste material to small particle size, normally closed valve-controlled means for admitting water into said chamber, means for discharging a mixture of water and reduced waste material from said apparatus, and an electric drive motor for operating said comminution means and said discharge means: the combination of electromotor means operable when energized to open said water valve, an electric circuit for energizing said electromotor means, an electric circuit for energizing said drive motor, a relay having control switch means common to said electric circuits, said relay having an electromagnetic coil in circuit with said drive motor to draw electrical energy in proportion to the energy drawn by said motor, and an armature for operating said switch means, said relay coil holding said armature in switch-closing position against a bias urging said control switch means to open-circuit position at electrical energy levels characteristic of motor operation under load and releasing said armature at energy levels characteristic of the no-load operation of said motor, a lever operatively associated with said armature to move the same, means including a cam follower disposed within said chamber for operating said lever, and cam means on said closure effective upon rotation of said closure to a first predetermined position to engage said cam follower to operate said lever for movement of the armature to control-switch closing position, and upon rotation of said closure from said first position to a second predetermined position to position said lever releasing said armature for action according to the energy level of said relay coil.

4. In a waste disposal apparatus having a chamber to receive waste material, a removable closure for an entrance to said chamber, means for supporting said closure for manual rotation to any one of a plurality of positions within said chamber entrance, comminution means within said chamber for mechanically reducing said waste material to small particle size, normally closed valve-controlled means for admitting water into said chamber, means for discharging a mixture of water and reduced waste material from said apparatus, and an electric drive motor for operating said comminution means and said discharge means: the combination of electromotor means operable when energized to open said water valve, an electric circuit for energizing said electromotor means, an electric circuit for energizing said drive motor, an electromagnetic coil in circuit with said drive motor to draw electrical energy in proportion to the energy drawn by said motor, control switch means common to said valve motor circuit and said drive motor circuit, a magnetic armature responsive to the energy of said electromagnetic coil to operate said control switch means, means biasing said armature to switch-opening position, said coil holding said armature in switch-closing position against said bias at electrical energy levels characteristic of drive motor operation under load and releasing said armature at energy levels characteristic of a predetermined lesser load operation of said motor, and a lever system operated by rotation of said closure and engaging with said armature to move the armature mechanically to circuit-closing position of the control switch upon rotation of said closure to a first predetermined position and to release said armature for action dictated by the energy level of said coil upon rotation of said closure from said first to a second predetermined position.

5. In waste disposal apparatus having electric motor-operated means to comminute and discharge waste material, and an electrical circuit for energizing said motor: a control system comprising electromagnetic means in said motor-energizing circuit, said electromagnetic means drawing current in proportion to the current being drawn by said motor, a control switch in said motor-energizing circuit, an armature for said electromagnetic means, means for actuating said control switch to closed circuit position by displacement of said armature upon energization of said electromagnetic means above a predetermined threshold level, means biasing said armature for displacement in a direction returning said switch to open circuit position upon reduction in said electromagnetic energy below said level, whereby said electromagnetic means maintains said switch actuating armature in circuit-closing position at levels of electrical energy corresponding to a first load condition of said motor and releases said switch armature at levels of energy corresponding to a second load condition of said motor, means for optionally mechanically latching said armature in circuit-closing position regardless of the energy level of the electromagnetic means, and means for optionally rendering said mechanical latching means inoperative after first closing said switch to energize said motor and said electromagnetic means.

6. In a waste disposal apparatus having a comminution chamber for receiving waste material, mechanical comminution means in said chamber, means for discharging comminuted material from said apparatus, and an electric motor for driving said comminution and discharge means: a control system comprising an electric circuit for energizing said motor, control switch means in said circuit, means biasing said switch means to open-circuit position, electromagnetic means for operating said control switch means to closed-circuit position, said electromagnetic means being disposed in said motor-energizing circuit and drawing electrical energy therefrom in proportion to the current drawn by said motor, said electromagnetic means being effective at a level of electrical energy corresponding to a loaded condition of said motor to hold said switch means in closed-circuit condition and releasing said switch means for return to open-circuit position upon reduction in electrical energy to a level corresponding to a no-load condition of the motor, and manually operable means having a first operative position for mechanically closing said switch means and the energizing circuit of said electromagnetic means, and a second operative position effective after said first position has been attained to release said mechanical switch closing means for operation of said switch dictated solely by the energy level of said electromagnetic means.

7. In a waste disposal apparatus having a chamber for receiving a quantity of material to be comminuted, mechanical comminution means in said chamber, means for discharging comminuted material from said apparatus and an electric motor for driving said comminution and discharge means: a control system comprising an electric circuit for energizing said motor, control switch means in said circuit, means biasing said switch means to open-circuit position, electromagnetic means for operating said control switch means to closed-circuit position, said electromagnetic means being disposed in said motor energizing circuit and drawing electrical energy therefrom in proportion to the current drawn by said motor, said electromagnetic means being effective at a level of electrical energy corresponding to a loaded condition of said motor to hold said switch means in closed-circuit condition and releasing said switch means for return to open-circuit position upon reduction in electrical energy to a level corresponding to a predetermined lesser load condition of the motor, means for initially mechanically closing said switch means and the energizing circuit of said electromagnetic means, and manually operable means for subsequently rendering said mechanical switch-closing means ineffective to retain said switch in closed-circuit position at the second said energy level of said electromagnetic means.

8. In a waste disposal apparatus having a chamber for receiving a quantity of material for comminution, mechanism within said chamber for comminuting said material, means for discharging comminuted material from said apparatus, an electric motor for driving said comminution and discharge means, and water supply means for admitting water into said chamber, a control system comprising an electric circuit for energizing said motor for operation thereof, a control switch in said circuit, means biasing said switch to open-circuit position, an electromagnetic coil in said motor circuit and drawing electrical energy therefrom in proportion to the energy drawn by said motor, a magnetic armature for said electromagnetic coil, said armature carrying a contact element of said switch and responsive to energization of said coil at an electrical energy level above a predetermined base to operate said switch to closed-circuit position and maintain it closed against the said switch bias and to operate said switch to open-circuit position upon drop in the energy drawn by said motor to below said base, manually operable means to close said switch initially for energization of said motor and said coil, normally closed valve means in said water supply means, a magnetic coil for operating said valve means to open position, and circuit means responsive to the operation of said switch to closed circuit position to operate said valve means to open position for admission of water to said chamber.

References Cited in the file of this patent

UNITED STATES PATENTS

| | | |
|---|---|---|
| 1,559,832 | Wright et al. | Nov. 3, 1925 |
| 1,867,280 | Rippl | July 12, 1932 |
| 1,942,166 | Gisser | Jan. 2, 1934 |
| 2,044,564 | Carter | June 16, 1936 |
| 2,302,610 | Kuehl et al. | Nov. 17, 1942 |
| 2,551,395 | Rimann | May 1, 1951 |